United States Patent
DeSilva et al.

(10) Patent No.: US 9,453,784 B2
(45) Date of Patent: Sep. 27, 2016

(54) NON-INTRUSIVE MEASUREMENT OF HOT GAS TEMPERATURE IN A GAS TURBINE ENGINE

(71) Applicant: Siemens Energy, Inc., Orlando, FL (US)

(72) Inventors: Upul P. DeSilva, Oviedo, FL (US); Heiko Claussen, Plainsboro, NJ (US); Michelle Xiaohong Yan, Princeton, NJ (US); Justinian Rosca, West Windsor, NJ (US); Nancy H. Ulerich, Longwood, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 507 days.

(21) Appl. No.: 14/017,386

(22) Filed: Sep. 4, 2013

(65) Prior Publication Data
US 2015/0063411 A1    Mar. 5, 2015

(51) Int. Cl.
| | |
|---|---|
| *G01K 11/24* | (2006.01) |
| *G01M 15/14* | (2006.01) |
| *F02C 7/32* | (2006.01) |
| *G01K 13/02* | (2006.01) |
| *G01H 3/00* | (2006.01) |

(52) U.S. Cl.
CPC ............... *G01M 15/14* (2013.01); *F02C 7/32* (2013.01); *G01H 3/00* (2013.01); *G01K 11/24* (2013.01); *G01K 13/02* (2013.01); *F05D 2260/83* (2013.01); *G01K 2013/024* (2013.01)

(58) Field of Classification Search
CPC ...................................................... G01K 11/24
USPC ......................................................... 374/119
See application file for complete search history.

(56) References Cited

U.S. PATENT DOCUMENTS

| | | | |
|---|---|---|---|
| 3,427,881 A | 2/1969 | Steinberg | |
| 3,451,269 A | 6/1969 | Johnson | |
| 3,723,956 A * | 3/1973 | Carman | H04B 11/00 367/133 |
| 3,769,839 A | 11/1973 | Innes | |
| 3,885,436 A | 5/1975 | Meyer | |

(Continued)

FOREIGN PATENT DOCUMENTS

| | | |
|---|---|---|
| EP | 0304170 A2 | 2/1989 |
| JP | 2004108826 A * | 4/2004 |

OTHER PUBLICATIONS

Roberto Roubicek; Gas Temperature Measurement in the Fireside of Process Heaters-Using Acoustic Pyrometry; 2003 NPRA Maintenance Conference; 2003; Salt Lake City, Utah.

(Continued)

*Primary Examiner* — Minh Phan
*Assistant Examiner* — Leon W Rhodes, Jr.

(57) ABSTRACT

A method and apparatus for operating a gas turbine engine including determining a temperature of a working gas at a predetermined axial location within the engine. An acoustic signal is encoded with a distinct signature defined by a set of predetermined frequencies transmitted as a non-broadband signal. Acoustic signals are transmitted from an acoustic transmitter located at a predetermined axial location along the flow path of the gas turbine engine. A received signal is compared to one or more transmitted signals to identify a similarity of the received signal to a transmitted signal to identify a transmission time for the received signal. A time-of-flight is determined for the signal and the time-of-flight for the signal is processed to determine a temperature in a region of the predetermined axial location.

16 Claims, 6 Drawing Sheets

(56) References Cited

U.S. PATENT DOCUMENTS

| | | | |
|---|---|---|---|
| 4,020,693 | A | 5/1977 | Ahlgren et al. |
| 4,848,924 | A | 7/1989 | Nuspl et al. |
| 5,275,553 | A | 1/1994 | Frish et al. |
| 5,349,859 | A | 9/1994 | Kleppe |
| 5,392,645 | A | 2/1995 | Kleppe |
| 5,404,833 | A | 4/1995 | Kleppe |
| 5,624,188 | A | 4/1997 | West |
| 6,142,665 | A | 11/2000 | Haffner et al. |
| 6,386,755 | B1 | 5/2002 | Draxton et al. |
| 6,564,164 | B1 | 5/2003 | Ih et al. |
| 6,726,358 | B2 | 4/2004 | Draxton et al. |
| 6,745,632 | B1 * | 6/2004 | Dryer .................. G01N 29/024 73/597 |
| 6,768,938 | B2 | 7/2004 | McBrien et al. |
| 6,834,992 | B2 | 12/2004 | Draxton et al. |
| 7,013,210 | B2 | 3/2006 | McBrien et al. |
| 7,383,165 | B2 | 6/2008 | Aragones |
| 7,434,988 | B1 | 10/2008 | Kychakoff et al. |
| 7,761,216 | B2 | 7/2010 | Norris et al. |
| 2007/0027607 | A1 | 2/2007 | Norris et al. |
| 2007/0151363 | A1 | 7/2007 | Ramsesh |
| 2010/0076698 | A1 | 3/2010 | He et al. |
| 2012/0044786 | A1 * | 2/2012 | Booij .................. G01S 3/8083 367/127 |
| 2012/0150413 | A1 | 6/2012 | Bunce et al. |

OTHER PUBLICATIONS

J. A. Kleppe et al.; The Application of Acoustic Pyrometry to Gas Turbines and Jet Engines; AIAA 98-3611; 1998.

Gustave C. Fralick et al.; Passive Acoustic Tomography Tested for Measuring Gas Temperatures; Research and Technology 2003; May 2004; NASA Glenn Research Center, Cleveland, OH.

Gustave C. Fralick; Acoustic Pyrometry Applied to Gas Turbines and Jet Engines; www.grc.nas.gov/WWW/RT/RT1998/5000/5510; 1998.

Dr. Peter Ariessohn; Development of an Acoustic Sensor for On-Line Gas Temperature Measurement in Gasifiers; Technical Progress Report; Enertechnix, Inc.; Quarterly Report Oct. 1, 2005 to Dec. 31, 2005; Issued Jan. 15, 2006; 12 pages.

Brian Moss et al.; Temperature Measurement of Gases using Acoustic Means; 2009 6th International Multi-Conference on Systems, Signals and Devices; 2009; 6 pages.

Raviraj Adve; University of Toronto; "Smart Antennas" course notes; 2007; 25 pages.

Dr. Peter Ariessohn; Development of an Acoustic Sensor for On-Line Gas Temperature Measurement in Gasifiers; Final Report; Enertechnix, Inc.; Final Report Jun. 11, 2003-Jun. 20, 2008; Issued Jul. 31, 2008; 57 pages.

Mauro Bramanti et al.; An Acoustic Pyrometer System for Tomographic Thermal Imaging in Power Plant Boilers; IEEE Transactions on Instrumentation and Measurement; vol. 45, No. 1; Feb. 1996; 9 pages.

G.Q. Shen et al.; Real-Time Monitoring on Boiler Combustion Based on Acoustic Measurement; IEEE Power India Conference; 2006; 4 pages.

R.H. Stones et al.; The Application of Acoustic Pyrometry to Gas Temperature Measurement and Mapping; IEEE Colloquium on Ultrasound in the Process Industry; Sep. 23, 1993; 2 pages.

John A. Kleppe et al.; The Application of Digital Signal Processing to Acoustic Pyrometry; Proc. 1996 IEEE Digital Signal Processing Workshop; 1996; pp. 420-422.

John A. Kleppe et al.; The Application of Image Processing to Acoustic Pyrometry; 1996; pp. 657-659.

K. Srinivasan et al.; Effects of acoustic source and filtering on time-of-flight measurements; Applied Acoustics 70; 2009; pp. 1061-1072.

William J. Norris et al.; The Measurement of Performance of Combustors Using Passive Acoustic Methods: Additional Results; 43rd AIAA Aerospace Sciences Meeting and Exhibit; Jan. 10-13, 2005; American Institute of Aeronautics and Astronautics; 9 pages.

TMS 2000—Theory of Operation; SEI, Inc.; Mar. 1, 2002; 2 pages.

Upul Desilva et al.; Novel Gas Turbine Exhaust Temperature Measurement System; Proceedings of the ASME Turbo Expo 2013; GT2013-95153; Jun. 3-7, 2013; 8 pages.

* cited by examiner

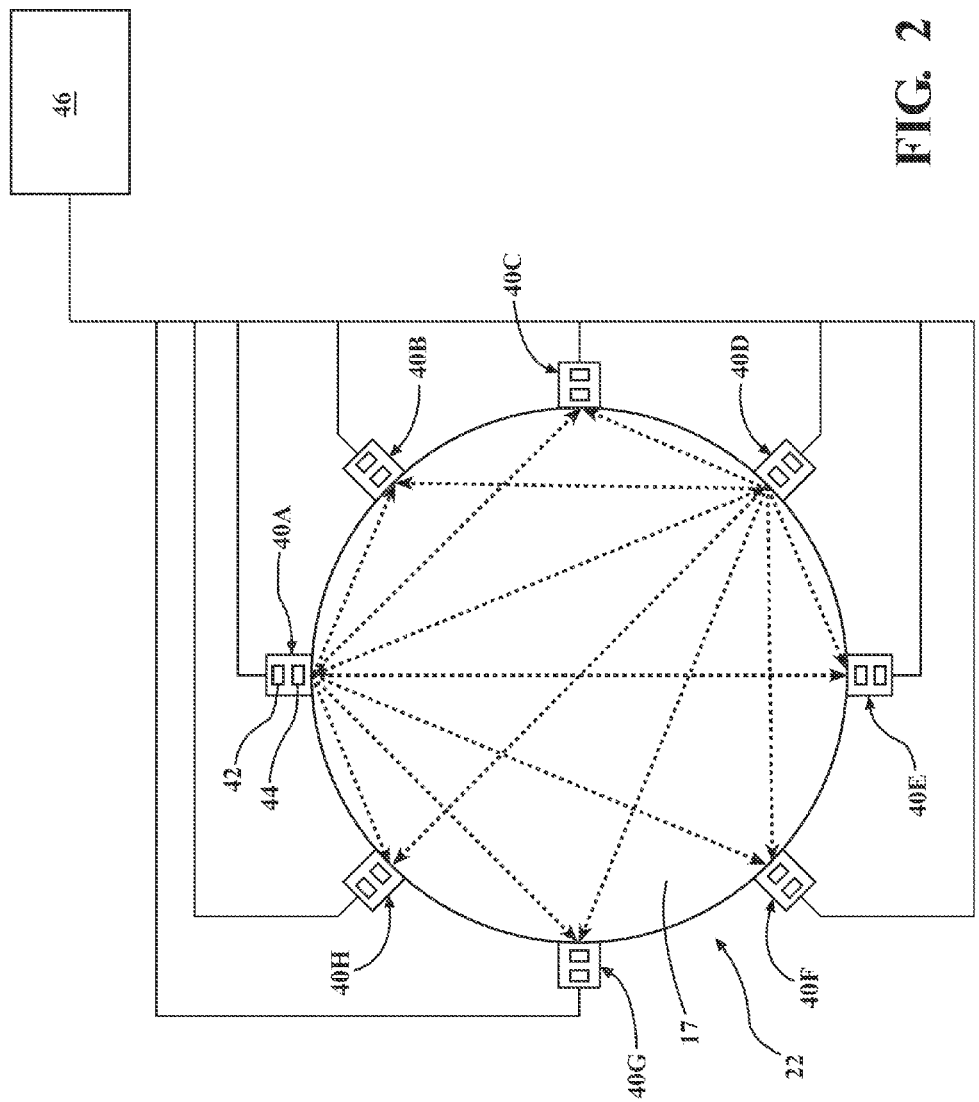

NON-INTRUSIVE MEASUREMENT OF HOT GAS TEMPERATURE IN A GAS TURBINE ENGINE

STATEMENT REGARDING FEDERALLY SPONSORED DEVELOPMENT

Development for this invention was supported in part by Contract No. DE-FC26-05NT42644, awarded by the United States Department of Energy. Accordingly, the United States Government may have certain rights in this invention

FIELD OF THE INVENTION

The present invention relates to temperature measurement in turbine engines and, more particularly, to determination of temperature of a hot gas using acoustic measurements in a gas turbine engine.

BACKGROUND OF THE INVENTION

Combustion turbines, such as gas turbine engines, generally comprise a compressor section, a combustor section, a turbine section and an exhaust section. In operation, the compressor section can induct and compress ambient air. The combustor section generally may include a plurality of combustors for receiving the compressed air and mixing it with fuel to form a fuel/air mixture. The fuel/air mixture is combusted by each of the combustors to form a hot working gas that may be routed to the turbine section where it is expanded through alternating rows of stationary airfoils and rotating airfoils and used to generate power that can drive a rotor. The expanding gas exiting the turbine section can be exhausted from the engine via the exhaust section.

The fuel/air mixture at the individual combustors is controlled during operation of the engine to maintain one or more operating characteristics within a predetermined range, such as, for example, to maintain a desired efficiency and/or power output, control pollutant levels, prevent pressure oscillations and prevent flameouts. In a known type of control arrangement, a bulk turbine exhaust temperature may also be monitored as a parameter indicative of a condition in the combustor section. For example, a controller may monitor a measured turbine exhaust temperature relative to a reference temperature value, and a measured change in temperature may result in the controller changing the fuel/air ratio at the combustor section.

In a known temperature monitoring system for controlling combustion operations, temperature monitors, such as thermocouples, are located directly in the exhaust flow of the turbine. Such monitoring systems generally require locating thermocouples at different fixed axial locations along the exhaust flow, which may introduce uncertainties in relation to temperature calculations for controlling the engine as conditions affecting operation of the engine change, such as a varying load condition on the engine. Providing temperature measurements of the hot working gas upstream of the turbine section has proven problematic due to difficulties in providing a sensor system capable of providing accurate temperature measurements on a long term basis in this region of the engine.

SUMMARY OF THE INVENTION

In accordance with an aspect of the invention, a method of operating a gas turbine engine is provided, including determining a temperature of a working gas passing through a flow path within the gas turbine engine. The method comprises the steps of transmitting an acoustic signal from an acoustic transmitter located at a predetermined axial location along the flow path of the gas turbine engine. The acoustic signal is received from the acoustic transmitter at an acoustic receiver located at the predetermined axial location, the acoustic signal being encoded with a distinct signature defined by a set of predetermined frequencies transmitted as a non-broadband acoustic signal. The step of receiving the acoustic signal includes comparing a received signal to one or more transmitted signals to identify a similarity of the received signal to a transmitted signal to identify a transmission time for the received signal. A time-of-flight is determined for the signal from the acoustic transmitter to the acoustic receiver, and the time-of-flight for the signal is processed to determine a temperature in a region of the predetermined axial location.

The step of comparing the received signal to one or more transmitted signals may include correlating frequencies of the received signal to a distinct signature of a transmitted signal to identify a transmission time for the signal.

The set of predetermined frequencies transmitted as a distinct signature may comprise a set of frequencies transmitted simultaneously for a predetermined time duration.

Each of the frequencies of the distinct signature may have an associated preset amplitude, and receiving the signal may include verifying a predetermined amplitude level for a plurality of the frequencies in the distinct signature received at the receiver to identify the corresponding distinct signature and an associated transmission time for the signal.

A plurality of distinct signatures may be provided, where each of the distinct signatures have a different set of predetermined frequencies than at least one other of the distinct signatures.

The plurality of distinct signatures may be transmitted simultaneously from a plurality of respective transmitters located around the flow path at the predetermined axial location.

The plurality of distinct signatures may be uncorrelated to each other.

A series of the distinct signatures may be transmitted sequentially in time, each of the distinct signatures having the same set of predetermined frequencies.

Transmission of each acoustic signal may include continuously generating the acoustic signal at a signal generator and operating an audio switch between the signal generator and the transmitter to selectively transmit portions of the continuously generated signal from the transmitter.

A current background noise may be monitored within the gas path on-line and the set of predetermined frequencies may be adjusted forming one or more distinct signatures to have a low correlation to the current background noise.

In accordance with another aspect of the invention, a gas turbine engine is provided including an apparatus for controlling operation of the gas turbine engine, and the engine having a boundary structure defining a flow path passing through the engine. The apparatus for controlling operation of the engine comprises at least one acoustic transmitter located on the boundary structure at a predetermined axial location along the flow path, and at least one acoustic receiver located on the boundary structure at the predetermined axial location. A signal generator that produces at least one signal having a distinct signature defined by a set of predetermined frequencies forming a non-broadband signal. A signal processor is configured to compare signals received at the receiver to one or more transmitted signals to identify a similarity of a received signal to a transmitted"

signal to identify a transmission time for the received signal. The processor is configured to determine a time-of-flight for the received signal and to process the time-of-flight to determine a temperature in a region of the predetermined axial location.

A signal generator may be provided for connection to the transmitter that continuously produces the at least one signal for a plurality of time-of-flight measurements.

An audio switch may be located between the signal generator and the transmitter to provide a signal to the transmitter from the generator for predetermined durations at predetermined spaced time intervals.

A plurality of acoustic transmitters and receivers may be located around a circumference of the boundary structure.

A plurality of signal generators may be connected to respective ones of the signal generators to provide a unique signal, having a distinct signature, to each of the transmitters. The plurality of signal generators may continuously produce the signals provided to the transmitters, and an audio switch may be located between each of the signal generators and the transmitters to provide a signal to each transmitter from a respective generator for predetermined durations at predetermined spaced time intervals.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

FIG. 2 is a diagrammatic view of the system for determining temperature;

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

A temperature measurement apparatus or system is described herein that is configured to be used to continuously monitor high temperature combustion gases, such as may be on the order of 1500° F., as part of an on-line monitoring and control system to be used on a long term basis within a gas turbine engine. In accordance with an aspect of the invention, it has been noted that acoustic pyrometry methods may be implemented to avoid placing temperature probes directly within the hot combustion gas flow, however, background noise associated with combustion, or other engine generated noises, can hinder accurate detection of sound signals that are transmitted into and received from the combustion gas path. The temperature measurement method and apparatus described herein is directed to production of one or more unique sound signals that are distinct and recognizable from sounds or noises produced by the engine, enabling accurate association of a received acoustic signal with a transmitted signal to enable identification of the received signal as having been transmitted by the system and to provide an associated time of transmission for the received signal. Having identifiable signals, with associated transmission and reception times, provides data for time-of-flight calculations of the signals through the hot gas path which can be used to estimate the temperature of locations within the gas path.

Figure 1:
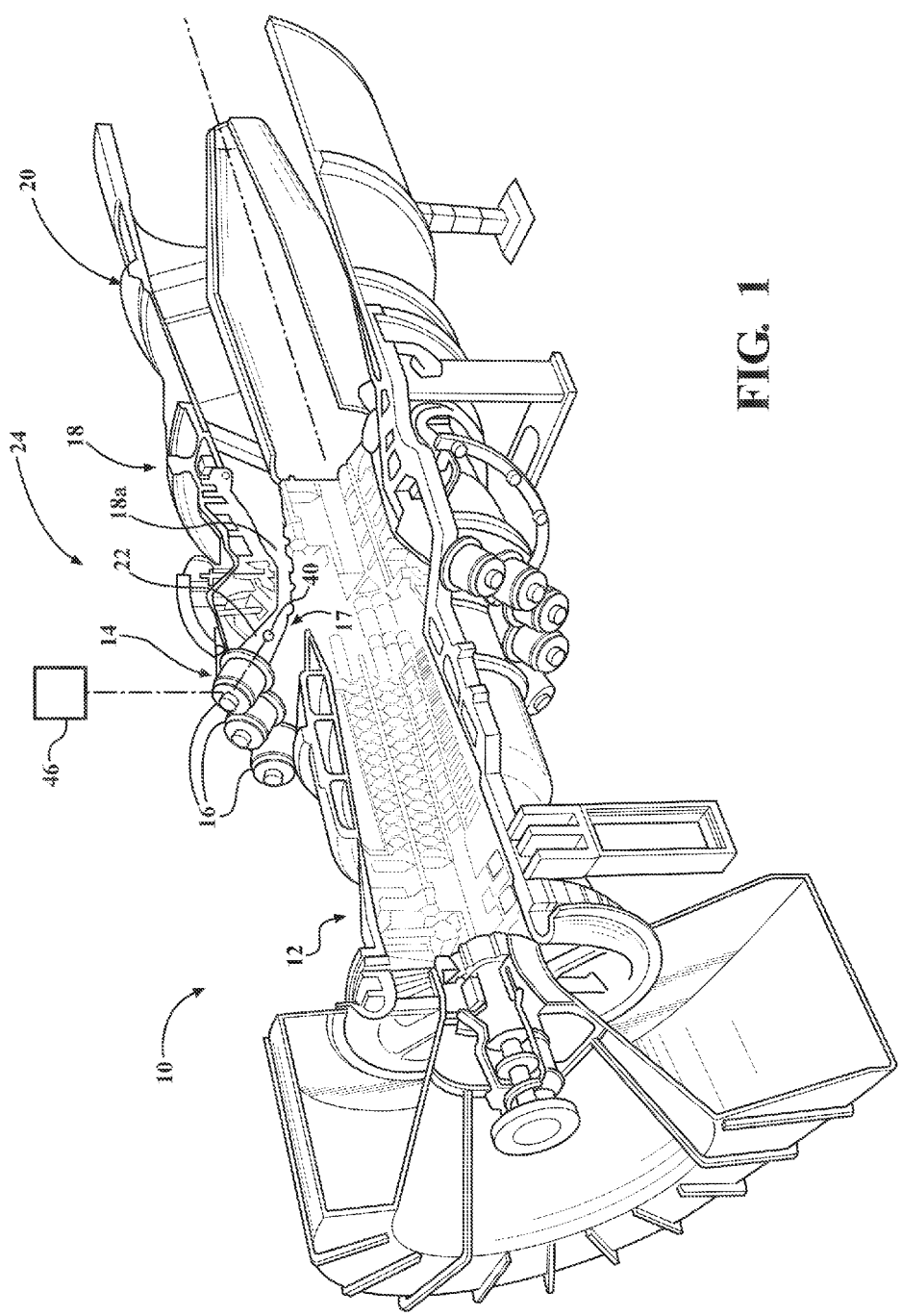
FIG. 1 is a perspective cross-sectional view of a gas turbine engine illustrating implementation an acoustic temperature measurement system in accordance with aspects of the present invention.

Referring to FIG. 1, embodiments of the invention are directed to an acoustic temperature measurement system 24 that may be incorporated in a gas turbine engine 10 and to methods of using the acoustic temperature measurement system 24 to determine temperatures at predetermined locations in the engine 10 and to control an operation of the engine 10. Aspects of the invention will be explained in connection with possible configurations of the system 24, but the detailed description is intended only as exemplary.

Referring to the drawings, and in particular to FIG. 1, a portion of an exemplary gas turbine engine 10 is shown. The exemplary engine 10 includes a compressor section 12, a combustor section 14, a turbine section 18, and an exhaust section 20. The combustor section 14 includes a plurality of combustor baskets or combustors 16 and associated transition ducts 22, wherein the combustors 16 and transition ducts 22 define a flow path or passage 17 for conveying a hot working gas to the turbine section 18.

During operation of the engine 10, compressed air from the compressor section 12 is provided to the combustor section 14 where it is combined with fuel in the combustors 16, and the fuel/air mixture is ignited to form combustion products comprising the hot working gas. It may be understood that combustion of the fuel and air may occur at various axial locations along the passage to the inlet 18a of the turbine section 18. The hot working gas is expanded through the turbine section 18 and is exhausted through the exhaust section 20.

The acoustic temperature measurement system 24, is described herein with reference to locating acoustic devices (transmitters/receivers) for the system 24 at or adjacent to the inlet 18a for the turbine section 18 for determining a turbine inlet temperature, however, it may be understood that the system 24, and methods of operation for the system 24 may be implemented at other locations along the engine 12, such as at the exhaust section 20. In the described embodiment, the acoustic devices for the system 24 are positioned on the transition ducts 22 and a plurality of the acoustic devices may be located in a measurement plane of each transition duct 22 extending generally perpendicular to a longitudinal axis of the respective transition duct 22, i.e., perpendicular to a flow path 17 of the hot working gas within the duct 22. The location of the measurement plane defines a predetermined axial location at which temperature measurements are obtained along the flow path of the gas turbine engine 12.

A diagrammatic view of the acoustic temperature measurement system 24 is illustrated in FIG. 2, taken at a cross-section of one of the transition ducts 22. The system 24 comprises a plurality of audio transducer units 40 (only one transducer 40 shown in FIG. 1) supported around the circumference of the transition duct 22. The transducer units 40 are illustrated in FIG. 2 diagrammatically by the eight transducer units labeled 40A-40H, and may each include a housing supporting a speaker (transmitter) 42 and a microphone (receiver) 44, as indicated on transducer unit 40A. It should be understood that, within the spirit and scope of the present invention, a greater number or fewer transducer units 40 may be provided to perform a temperature sensing operation. For example, it may be desirable to provide a greater number of transducer units 40 to provide greater accuracy in mapping of temperatures within the flow path 17, as is described in greater detail below.

Each of the transducer units 40 includes an inner end that is positioned at an opening in the transition duct 22, where the transducer unit 40 is mounted to an outer surface of the transition duct 22, to emit acoustic signals and to receive acoustic signals. The transducer units 40 are connected to a processor or controller 46 that is configured to control the transducer units 40 to produce predetermined output signals and to receive time-of-flight signals corresponding to the output signals. The controller 46 is further configured to store and process data corresponding to the received signals to calculate temperatures and to produce outputs in accordance with the calculated temperatures associated with the received signals, as is described in greater detail below. The controller 46 is additionally configured to provide control signals for controlling operations affecting combustion, including signals to the individual combustors 16, providing control of, for example, the fuel/air ratio at the combustors 16.

During a data acquisition operation, at least one of the transducer units 40 may comprise a transmitting unit 40 producing a signal that traverses the hot gas flow path 17 in the plane defined by the plurality of transducer units 40, and at least one of the transducer units 40 may comprise a receiving unit 40, which is a different transducer unit 40 than the transmitting transducer unit 40. The time-of-flight of a signal traveling between the transmitting and the receiving units 40 may be used to determine an average temperature of the gas through which the signal has traveled. Specifically, the present invention uses the principle that the speed of sound in a gas changes as a function of temperature. For a determined or known composition of the gas, it is possible to determine the temperature of the gas based on the measured time for an acoustic or sound signal to travel the distance between the transmitting and receiving transducers 40, i.e., based on the speed of the sound signal traveling through the gas. The temperature, T (° C.), of the gas may be calculated using the equation:

$$T = \left(\frac{d}{B*t}\right)^2 - 273.16$$

where:
B=acoustic constant=

$$\sqrt{\frac{y*R}{M}},$$

(m/s)
γ=ratio of specific heats of the gas
R=universal gas constant, 8.314 J/mole- °K
M=molecular weight of the gas (Kg/mole)
d=distance traveled by sound signal (m)
t=time-of-flight of the sound signal (s)

Referring to FIG. 2, line-of-sound paths extending from two of the transducer units 40A and 40D to each of the other transducer units 40 are shown to illustrate exemplary intersecting line-of-sound-paths in accordance with an operation of the present invention, it being understood that the line-of-sound paths from each of the other transducer units 40 are formed in a similar manner, but are not illustrated in FIG. 2. A transmitted signal from each of the transducer units 40 may travel to and be received at each of the other transducer units 40.

It should be understood that, in addition to any signals transmitted from the transducer units 40, there is a substantial amount of noise present within the transition duct 22, such as may be produced by combustion events within and downstream from the combustor 16. This noise is present at various frequencies, including frequencies that may overlap frequencies of the acoustic signals produced by the transducer units 40, and may make it difficult to verify that received acoustic signals are valid signals to be included in the processing of the data received for performing a temperature determination. In accordance with an aspect of the invention, signals generated by the system 24 are formed as designed signals that can be clearly distinguished from the noise that is generated by the engine. The designed signals are formed with a predetermined signal pattern that is sparse in the time-frequency domain is therefore likely to be uncorrelated to the noise generated by the engine, which facilitates the ability to recognize and separate the signal from the engine generated noise. Also, the sparse signal pattern is designed to have a very narrow autocorrelation, which helps in determining an accurate time-of-flight in the presence of noise.

Figure 3A:
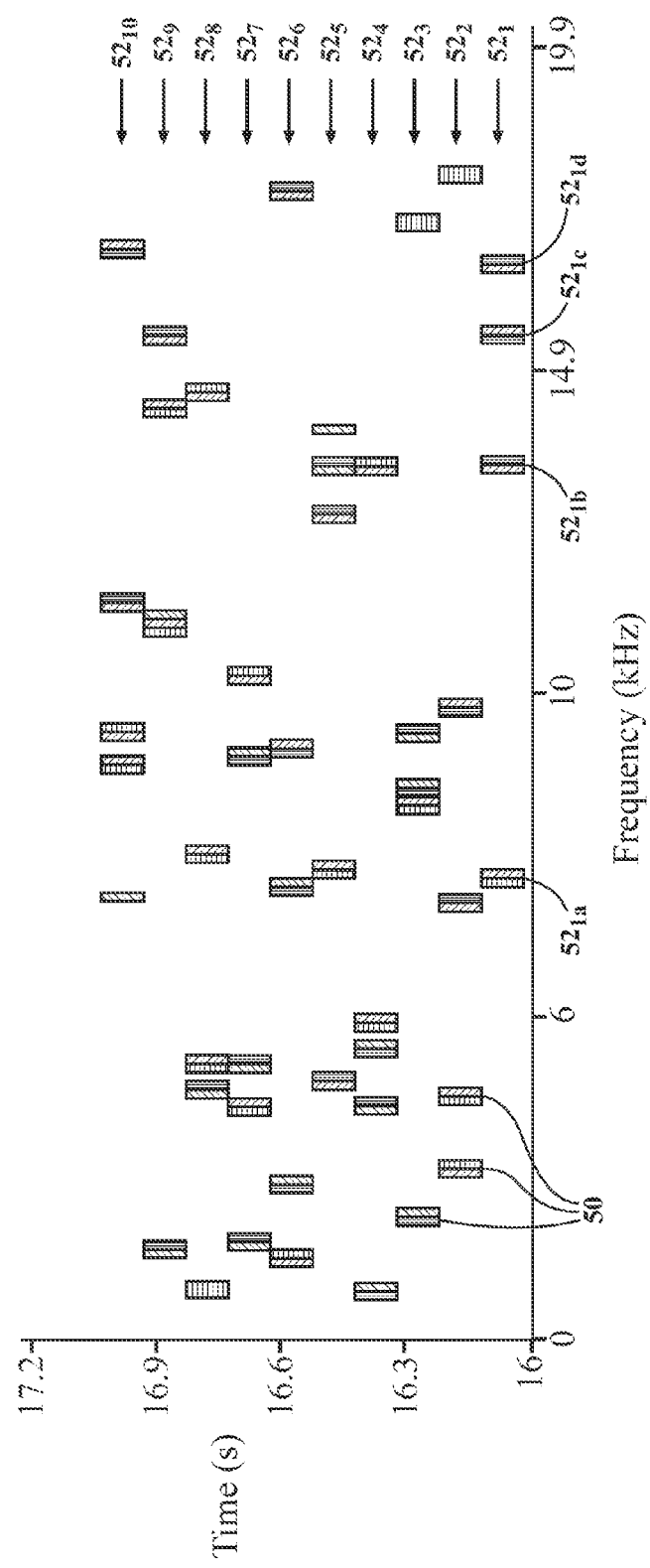
FIG. 3A is a chart illustrating an encoded signal produced by signal generator for transmission from a transducer in accordance with an aspect of the invention.
Figure 3B:
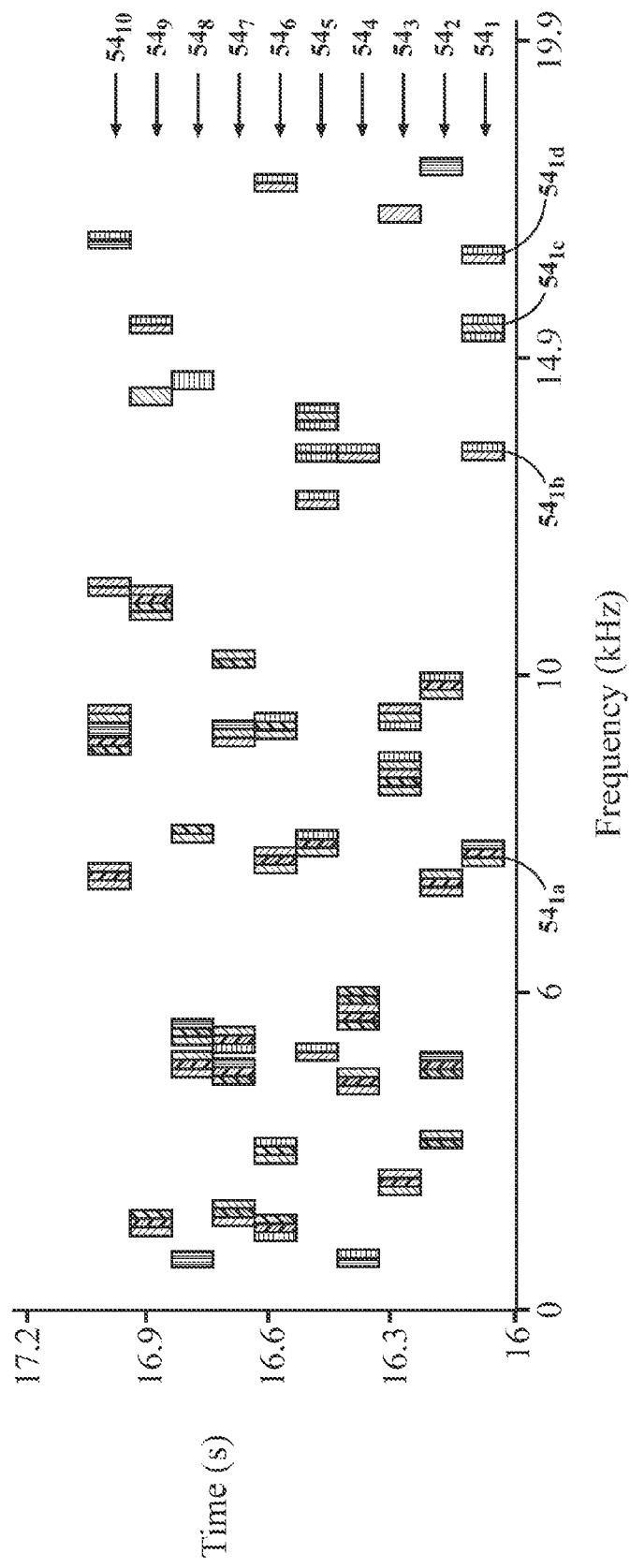
FIG. 3B is a chart illustrating an encoded signal received by a transducer and corresponding to the transmitted signal of FIG. 3A.

An example of a designed signal provided for transmission from a transducer unit 40 is illustrated in FIG. 3A, and an example of a corresponding signal received at another transducer unit 40 is illustrated in FIG. 3B. As can be seen in FIGS. 3A and 3B, the designed signals are depicted as distinct frequency marks, generally designated 50, that are spaced in both frequency, i.e., non-broadband, and time. That is, a group of distinct frequencies, e.g., four or five frequencies, are transmitted as a signal sub-group at a particular time, and the signal sub-groups are transmitted sequentially in time to form the encoded signal.

As illustrated in FIG. 3A, each signal sub-group is designated as $52_n$, where n=1, 2, 3 . . . , and the frequency marks 50 for each signal group, depicting distinct frequencies, are designated as $52_{nm}$, where m=a, b, c, . . . , as is particularly illustrated for a first signal sub-group $52_1$. The corresponding received signal depicted in FIG. 3B has similarly labeled signal sub-groups that are designated as sub-groups $54_n$, including distinct frequencies $54_{nm}$, as is particularly illustrated for a first received signal sub-group $54_1$. As can be seen in FIG. 3A, each successive signal sub-group $52_n$ includes different distinct frequencies $52_{nm}$ from the other signal sub-groups $52_n$ forming the transmitted signal.

Hence, in addition to the signal sub-groups $52_n$ each forming a distinct identifiable pattern, or individual signature, along the frequency axis, i.e., sparsely correlated in the frequency domain, the series of successive signal sub-groups $52_n$ also form a distinct identifiable pattern, or overall signature, of frequencies along the time axis, i.e., sparsely correlated in the time domain. That is, while a signature of the signal could be formed by only one signal sub-group $52_n$ defined by distinct frequencies, forming a signature of a plurality of the subgroups $52_n$ increases the distinctness of the signature and forms a signal with a sparse autocorrelation characteristic.

Further, it should be understood that in accordance with aspects of the invention, the background noise received at the transducer units 40 may be monitored by the system 24. Based on the detected background noise, the system 24 may change the signature of the transmitted signals in order to reduce the level of correlation relative to the frequencies generated by the engine and present as noise that is received at the transducer units 40.

The received signal sub-groups $54_n$ arrive at the receiving transducer 40 at some time after transmission from the transmitting transducer 40, where the delay corresponds to the time-of-flight to travel through the hot working gas, and may be used to determine the gas temperature as described above. Further, the distinct frequencies $52_{nm}$ forming each signal sub-group $52_n$ are transmitted for a time duration that is longer than the time for the signal sub-group to travel between the transmitting and receiving transducers 40 in order to provide a substantial received signal having a duration sufficiently long to be processed and identified by frequency and amplitude. It may be understood that a time-of-flight may be calculated for each signal sub-group based on the time that the transmission of the transmitted signal sub-group $52_n$ is initiated and the time that the received signal sub-group $54_n$ is initially received, i.e., based on the leading edges of the signal sub-groups $52_n$, $54_n$. Hence, the correlation of the received signal to the encoded transmitted signal provides a verifiable time of transmission for use with the detected reception time to determine an accurate time-of-flight.

Figure 4:
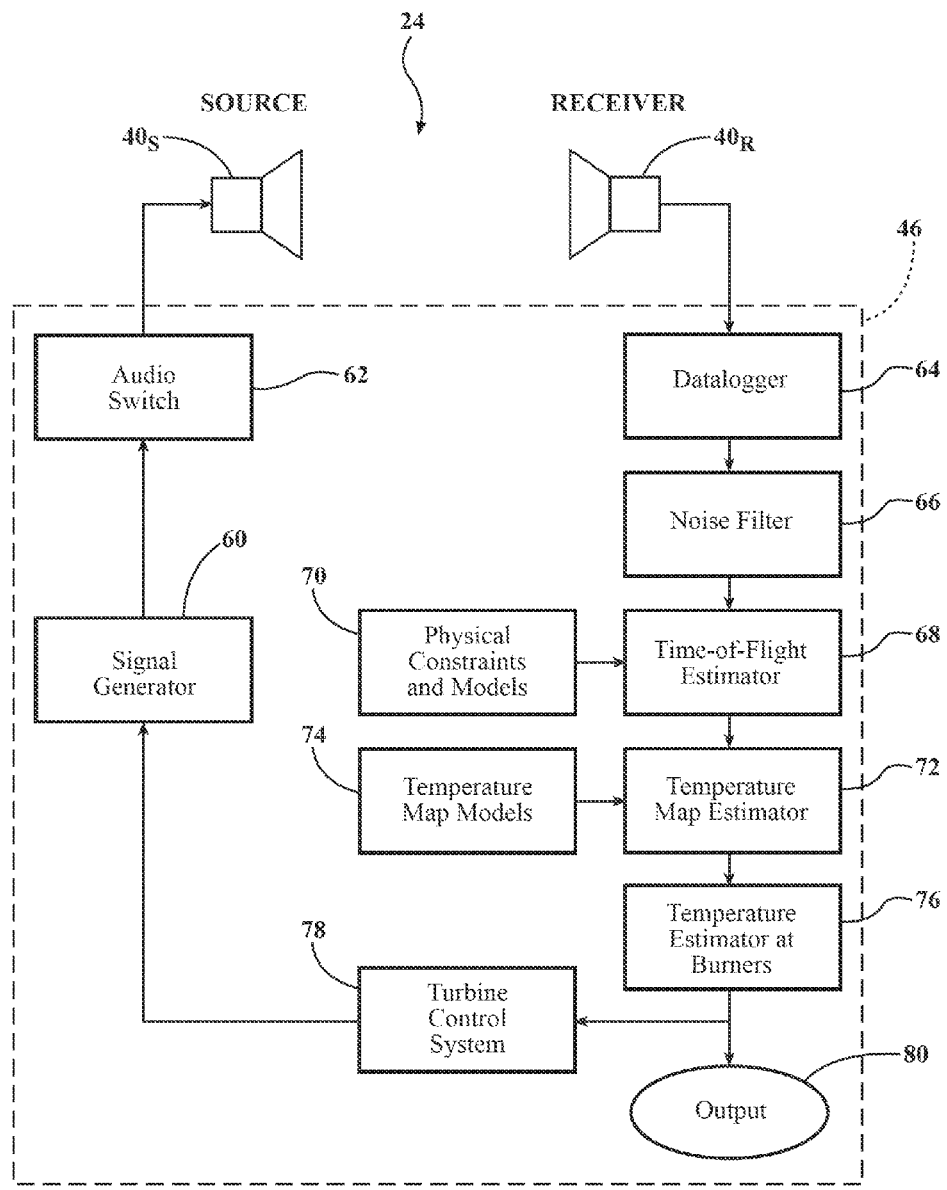
FIG. 4 is a schematic illustrating an apparatus including a controller for providing a temperature determination in accordance with aspects of the invention.

Referring to FIG. 4, the processor or controller 46 for performing signal generation and signal processing is illustrated. The controller 46 may include a signal generator 60 for producing a signal encoded with a distinct signature, as described above with reference to FIG. 3A. The signal generator 60 may operate under control of a turbine control system 78, and preferably produces the signal continuously, and an audio switch 62 controls output of the signal from the signal generator 60 to the speaker in a source transducer unit, designated $40_S$. The audio switch 62 is selectively controlled (on/off) in the controller 46 to pass the signal to the source transducer unit $40_S$. By using the audio switch 62, the signal provided to the source transducer unit $40_S$ will not include distortions of the signal, such as an initial gradual signal ramp up or a gradual ending ramp down, that could occur if the signal output were selectively controlled at the signal generator 60. Rather, a sharp ramp at the beginning and end of the signal, produced by turning the audio switch 62 on and off, further enables formation of a distinct signal. Additionally, the audio switch 62 can be used The controller 46 further may include a datalogger 64 for receiving and storing signals that are received at a receiver transducer unit $40_R$ located across the flow path 17 from the source transducer unit $40_S$. The datalogger 64 provides the signals to a noise filter 66 where the received signals are compared to the encoded signals that were sent from the source transducer unit $40_S$. The filtering may be characterized as identifying received signals, such as are illustrated in FIG. 3B, to the signals provided to the source transducer unit $40_S$, as illustrated in FIG. 3A. The received signals have distinct characteristics that include unique groups of frequencies occurring at particular times and in a particular sequence in time, and may additionally include a distinct intensity or amplitude associated with each frequency. Hence, each of these distinct characteristics may be used by the noise filter 66 to filter out or identify the signals received by the receiver transducer unit $40_R$ that correspond to the transmitted encoded signals. Other filtering techniques, such as conventional filtering techniques, could also be employed to additionally filter the received signals from noise.

Although the received signal may exhibit some distortion in frequency and amplitude as a result of passing through the hot working gas in the flow path 17, as seen from a comparison of the signals in FIGS. 3A and 3B, the received frequencies will substantially match the transmitted frequencies, and the amplitudes of the received frequencies will be at or above a predetermined amplitude level for a plurality of the frequencies in the distinct signature received at the receiver transducer unit $40_R$. It may be noted that there will be different attenuations of the amplitudes for the different frequencies, and the attenuations at the different frequencies will typically be constant for a given system setup or environment in which the temperature measurement system 24 is used. In FIGS. 3A and 3B, the different intensities or amplitudes are illustrated by different shade lines on the frequency marks 50 in these figures.

Filtered signals from the noise filter 66 are provided to a time-of-flight estimator 68. The time-of-flight estimator 68 identifies valid time-of-flight data for providing a temperature determination or estimate, and includes input from a physical constraints and models module 70. In particular, the physical constraints and models module 70 ensures that the time-of-flight estimates fit within a predicted or modeled criteria for the estimates. The physical constraints and models module 70 may reference various physical parameters that may have an effect on time-of-flight for the received signals including, for example, the physical locations of the source and receiver transducer units $40_S$, $40_R$, physically achievable temperature ranges including monitoring previously measured temperature maps, the range of possible gas constants/properties, the range of possible in plane flow and the resulting scattering of the time-of-flight, the model for the propagation of the sound, the sensitivity of the source and receiver transducer units $40_S$, $40_R$ and the maximal pressure levels for linear operation, and boundary conditions such as those associated with the temperature of the metal surfaces forming the boundary of the flow path 17.

The time-of-flight determinations or estimates are provided from the time-of-flight estimator 68 to a temperature map estimator 72 which correlates multiple time-of-flight estimates to determine or estimate a two-dimensional temperature map across the flow path 17, based on the plurality of line-of-sound paths illustrated in FIG. 2. The temperature map estimator 72 operates in conjunction with a temperature map models module 74 which provides a set of possible temperature maps, such as previously recorded maps and/or their basis functions. In particular, the temperature map will be a linear combination of the basis functions for modeling the temperatures within the area of flow path 17 at the measurement plane defined by the transducers 40. The temperature maps may be successive modifications of previous temperature maps, where each successive temperature map may comprise a temperature map that exhibits the least deviation from the measured time-of-flight data.

The temperature map estimated at the temperature map estimator 72 is transferred to a temperature estimator at burners module 76 that performs a back calculation to estimate the temperature at an upstream location of a burner 22 for the combustor 16. The estimated burner temperature is provided to the turbine control system 78 for controlling the engine, such as for controlling the fuel/air ratio at the burner 22. Additionally, the temperature may be provided as an output 80, such as may be located at an operator interface, for monitoring the engine.

Figure 5:
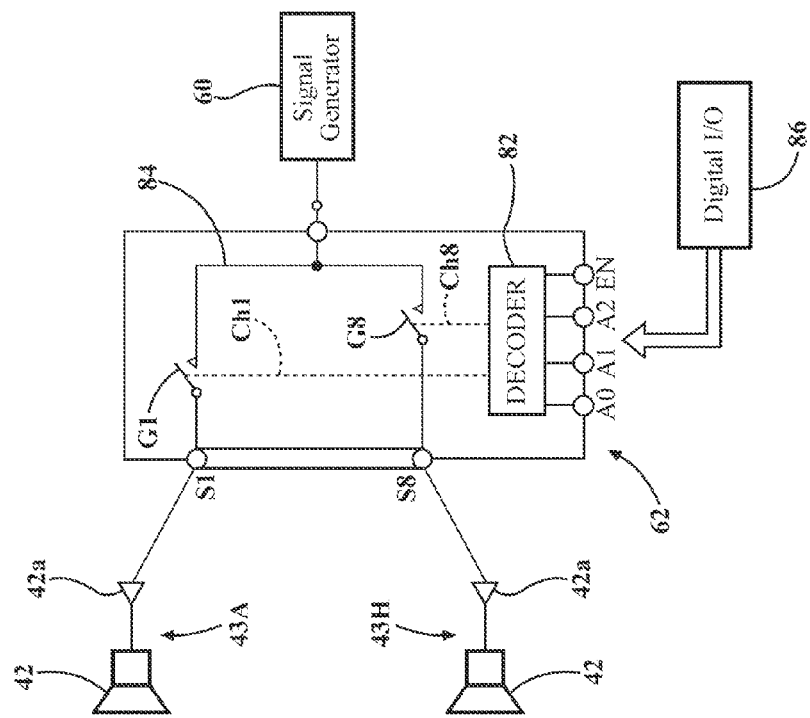
FIG. 5 is a schematic illustrating details of an audio switch in accordance with aspects of the invention.

Referring to FIG. 5, details of an audio switch 62 are illustrated for switching a signal from the signal generator 60 to form sequentially transmitted signals from each of the transducer units 40. In the present illustration, the audio switch 62 is configured to sequentially switch signals to eight transducer units 40A-40H, such as is shown in FIG. 2, where the audio switch 62 connects the signal generator 60 to only one of the transducer units 40A-40H at a time.

The audio switch 62 is diagrammatically depicted as including eight signal gates G1-G8 with associated outputs S1-S8, wherein only the first and eighth gates G1 and G8 are illustrated, it being understood that gates G2-G7 may be provided in the same manner as is illustrated for G1 and G8. Each of the gates G1-G8 may be selectively closed by a signal on a respective channel Ch1-Ch8 from a decoder 82 to connect a signal placed a common bus line 84 from the signal generator 60 to the speaker 42 in a respective one of the transducer units 40A-40H. It may be understood that the signal provided from the audio switch 62 may be amplified at the speakers 42 by an amplifier 42a associated with each of the speakers 42, wherein the speaker 42 and amplifier 42a form a transmission module 43A-43H for a respective transducer unit 40A-40H.

The decoder 82 has first, second and third address bits A0, A1, A2 for selecting channel addresses associated with each of the gates G1-G8, and an enable bit EN for enabling activation of the selected channel Ch1-Ch8. In an operation of the audio switch 62 a digital I/O interface 86 is activated by the turbine control system 78 to select a channel on the address bits A0, A1, A2 and the enable bit is enabled, i.e., switched from an "all off"=0 state to an "enable on"=1 state. For example, if A0=0, A1=0, A2=0, EN=1, then the first channel Ch1 is activated and the signal generator 60 is connected to the transmission module 43A of the first transducer unit 40A; if A0=0, A1=1, A2=0, EN=1, then the third channel Ch3 is activated and the signal generator 60 is connected to the transmission module 43C of the third transducer unit 40C; and if A0=1, A1=1, A2=1, EN=1, then the eighth channel Ch8 is activated and the signal generator 60 is connected to the transmission module 43H of the eighth transducer unit 40H.

The described audio switch 62 may be used to sequentially provide a signal from the signal generator 60, with sharp on and off ramps, to each of the transmission modules 43A-43H. Further, it may be understood that the same encoded signal may be provided from the signal generator 60 to each of the transmission modules 43A-43H.

Figure 6:
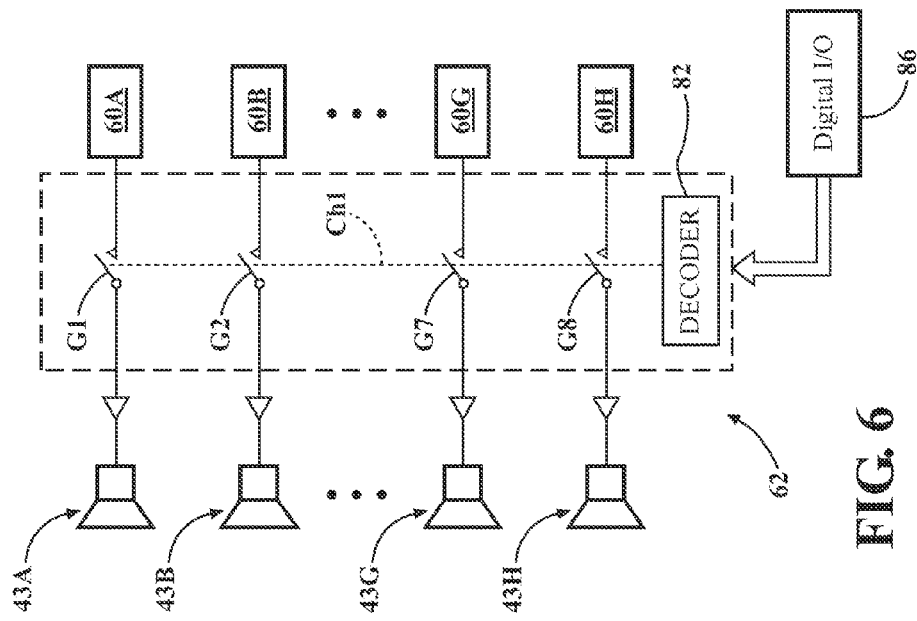
FIG. 6 is a schematic illustrating an alternative configuration for an audio switch in accordance with aspects of the invention.

FIG. 6 illustrates an alternative configuration for transmitting signals via the transmission modules 43A-43H. In this configuration, a separate signal generator 60A-60H may be provided for transmitting a unique encoded signal to each of the transmission modules 43A-43H. The audio switch 62 comprises a plurality of gates G1-G8 that may be actuated simultaneously by a single channel Ch1 activated through a decoder via a digital I/O interface 86 that is activated by the turbine control system 78. Each of the gates G1-G8 connects one of the signal generators 60A-60H to a corresponding one of the transmission modules 43A-43H. Hence, a plurality of encoded signals, e.g., eight unique or distinct encoded signals, may be transmitted simultaneously across the flow path 17 to provide time-of-flight data across all of the transducer units 40 at a single point in time.

Alternatively, the different gates G1-G8 of FIG. 6 may be triggered separately to provide the signals from the different signal generators 60A-60H to the transmission units 43A-43H at different selected times. In this case, the decoder 82 may be activated in a manner similar to that described with reference to FIG. 5, with separate addresses providing activation to corresponding channels for the gates G1-G8.

It may be understood that various aspects of the acoustic signals described for implementing the invention contribute to signals that have a sparse autocorrelation, and enabling identification of the signals as being distinct from non-signal related acoustic sounds or noise, and that various techniques for performing autocorrelation, as well as cross-correlation between transducer units 40, may be used in identifying a correspondence between transmitted and received signals for obtaining time-of-flight data.

Further, although the above description is presented with reference to providing a temperature determination within a combustor section 14 of the engine, the principles of operation described herein may be implemented in any region of the engine where it is desirable to obtain the temperature of a gas.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of operating a gas turbine engine, including determining a temperature of a working gas passing through a flow path within the gas turbine engine, the method comprising the steps of:

transmitting an acoustic signal from an acoustic transmitter located at a predetermined axial location along the flow path of the gas turbine engine;

receiving the acoustic signal from the acoustic transmitter at an acoustic receiver located at the predetermined axial location;

the acoustic signal being encoded with a distinct signature defined by a set of predetermined frequencies transmitted as a non-broadband acoustic signal;

wherein receiving the acoustic signal includes comparing a received signal to one or more transmitted signals to identify a similarity of the received signal to a transmitted signal to identify a transmission time for the received signal;

determining a time-of-flight for the signal from the acoustic transmitter to the acoustic receiver; and processing the time-of-flight for the signal to determine a temperature in a region of the predetermined axial location.

2. The method of claim 1, wherein comparing the received signal to one or more transmitted signals includes correlating frequencies of the received signal to a distinct signature of a transmitted signal to identify a transmission time for the signal.

3. The method of claim 1, wherein the set of predetermined frequencies transmitted as a distinct signature comprises a set of frequencies transmitted simultaneously for a predetermined time duration.

4. The method of claim 3, wherein each of the frequencies of the distinct signature has an associated preset amplitude, and receiving the signal includes verifying a predetermined amplitude level for a plurality of the frequencies in the distinct signature received at the receiver to identify the corresponding distinct signature and an associated transmission time for the signal.

5. The method of claim 1, including a plurality of distinct signatures, where each of the distinct signatures have a different set of predetermined frequencies than at least one other of the distinct signatures.

6. The method of claim 5, wherein the plurality of distinct signatures are transmitted simultaneously from a plurality of respective transmitters located around the flow path at the predetermined axial location.

7. The method of claim 6, wherein the plurality of distinct signatures are uncorrelated to each other.

8. The method of claim 1, including transmitting a series of the distinct signatures sequentially in time, each of the distinct signatures having the same set of predetermined frequencies.

9. The method of claim 1, wherein transmission of each acoustic signal includes continuously generating the acoustic signal at a signal generator and operating an audio switch between the signal generator and the transmitter to selectively transmit portions of the continuously generated signal from the transmitter.

10. The method of claim 1, including monitoring a current background noise within the gas path on-line and adjusting the set of predetermined frequencies forming one or more distinct signatures to have a low correlation to the current background noise.

11. A gas turbine engine including an apparatus for controlling operation of the gas turbine engine, and the engine having a boundary structure defining a flow path passing through the engine, the apparatus for controlling operation of the engine comprising:
 at least one acoustic transmitter located on the boundary structure at a predetermined axial location along the flow path;
 at least one acoustic receiver located on the boundary structure at the predetermined axial location;
 a signal generator producing at least one signal having a distinct signature defined by a set of predetermined frequencies forming a non-broadband signal;
 a signal processor configured to compare signals received at the receiver to one or more transmitted signals to identify a similarity of a received signal to a transmitted signal to identify a transmission time for the received signal, and the processor configured to determine a time-of-flight for the received signal and to process the time-of-flight to determine a temperature in a region of the predetermined axial location.

12. The apparatus of claim 11, including a signal generator for connection to the transmitter that continuously produces the at least one signal for a plurality of time-of-flight measurements.

13. The apparatus of claim 12, including an audio switch between the signal generator and the transmitter to provide a signal to the transmitter from the generator for predetermined durations at predetermined spaced time intervals.

14. The apparatus of claim 11, including a plurality of acoustic transmitters and receivers located around a circumference of the boundary structure.

15. The apparatus of claim 11, including a plurality of signal generators connected to respective ones of the signal generators to provide a unique signal, having a distinct signature, to each of the transmitters.

16. The apparatus of claim 15, wherein the signal generators continuously produce the signals provided to the transmitters, and including an audio switch between each of the signal generators and the transmitters to provide a signal to each transmitter from a respective generator for predetermined durations at predetermined spaced time intervals.

\* \* \* \* \*